(12) United States Patent
Sun et al.

(10) Patent No.: US 10,556,572 B2
(45) Date of Patent: Feb. 11, 2020

(54) APPARATUS AND METHOD FOR LOWERING AND RAISING A TRAILER

(71) Applicants: David R. Sun, Placentia, CA (US); Darrell Brubaker, Eaton, OH (US)

(72) Inventors: David R. Sun, Placentia, CA (US); Darrell Brubaker, Eaton, OH (US)

(*) Notice: Subject to any disclaimer, the term of this patent is extended or adjusted under 35 U.S.C. 154(b) by 0 days.

(21) Appl. No.: 15/881,492

(22) Filed: Jan. 26, 2018

(65) Prior Publication Data

US 2019/0031159 A1  Jan. 31, 2019

Related U.S. Application Data

(60) Provisional application No. 62/451,434, filed on Jan. 27, 2017, provisional application No. 62/472,825, filed on Mar. 17, 2017.

(51) Int. Cl.
*B60S 9/04* (2006.01)
*B60S 9/12* (2006.01)
*B60S 9/06* (2006.01)

(52) U.S. Cl.
CPC . *B60S 9/12* (2013.01); *B60S 9/04* (2013.01); *B60S 9/06* (2013.01); *B60Y 2200/148* (2013.01)

(58) Field of Classification Search
CPC ...... B60S 9/02; B60S 9/04; B60S 9/06; B60S 9/08
See application file for complete search history.

(56) References Cited

U.S. PATENT DOCUMENTS 8,590,417 B1 * 11/2013 Bono ..................... G05G 1/085
254/419
2012/0160529 A1 * 6/2012 Eshleman ............... B25B 21/00
173/1

* cited by examiner

*Primary Examiner* — Bryan A Evans
(74) *Attorney, Agent, or Firm* — Marcus C. Dawes (57) ABSTRACT

A device and method used to raise or lower the landing gear of a semi-trailer. The device is coupled to the landing gear of the semi-trailer and actuates the landing gear according to user selection. The user may select to actuate the landing gear through a motorized gear assembly within the device, by optionally attaching a handle to the landing gear via the device, or by engaging a separate motorized hand tool to the landing gear via the device. To use the handle or the motorized hand tool, the user actuates a shift lever disposed on the device which disengages the related mechanical means for actuating the landing gear. The flexibility for actuating the landing gear allows a user to raise or lower the landing gear according to the surrounding circumstances or in case one of the means for actuating breaks or fails.

18 Claims, 8 Drawing Sheets

FIG. 7 ial application Ser. No. 62/451,434, filed on Jan. 27,
APPARATUS AND METHOD FOR LOWERING AND RAISING A TRAILER

RELATED APPLICATIONS

The present application is a non-provisional of U.S. provisional application Ser. No. 62/451,434, filed on Jan. 27, 2017 and of U.S. provisional application Ser. No. 62/472,825, filed on Mar. 17, 2017, which are incorporated herein by reference and to which priority is claimed pursuant to 35 USC 120.

BACKGROUND

Field of the Technology

The invention relates to the field of lift devices for semi-trailers, specifically a new and useful apparatus for raising and lowering a semi-trailer.

Description of the Prior Art

Semi-trucks and other cargo trucks are crucial for delivering goods and supplies to and from various ports and harbors or across the country. Indeed, semi-trailers not only transport goods throughout the country from distribution centers to warehouses, they are also used to perform the shipping logistics for an untold number of businesses all over the globe. Typically, when a semi-truck arrives at its destination, a set of landing gear disposed on the underside of the semi-trailer portion are lowered to the ground and any air or electrical connections between the semi-trailer and the tractor unit are disconnected. The tractor unit is then free to move or drive away, leaving the semi-trailer stationary in place to be unloaded or loaded as needed.

Because shipping time can be critical, semi-trailers often need to be turned around in as short a period of time as possible. Therefore it is critical during the loading or unloading of semi-trailers that the landing gear are deployed as efficiently and smoothly as possible while also ensuring that the semi-trailer is placed in a safe, stable position while being loaded or unloaded. The landing gear attached to many semi-trailers principally comprises a retractable vertical support that may be raised or lowered by the turning or rotation of a crank or drive shaft. In most applications, the user first engages a handle to the crank or drive shaft that is coupled to the vertical support and then begins rotating the handle crank by hand, thereby lowering or extending the vertical support. The user continues to rotate the handle until the vertical support touches or nearly touches the ground. With the remaining connections between the semi-trailer and tractor unit removed, the tractor unit is driven away leaving the semi-trailer to rest on the ground via the landing gear. After reattaching the semi-trailer to the tractor unit, the user rotates the handle in the opposing direction to raise or retract the landing gear off of the ground and into or against the semi-trailer.

While the vertical support of the landing gear may be raised effectively using a handle or turn crank, it can be time consuming and physically difficult to perform when the shaft is not properly lubricated or when environmental conditions such as rain or extreme cold make it difficult for the user to exit the tractor unit and manually turn the crank shaft. Previous attempts to solve this problem have included landing gear which comprise a motor or other automated mechanical means which engage and rotate the shaft when the user activates a push button or other initializing means. However, motorized actuators or the like do not allow for any alternative means for directly rotating the drive shaft in the event that the motorized actuator breaks down or fails. Instead, if the motorized actuator fails, the user must open the casing or housing of the actuator, insert a specialized tool into the gear assembly of the actuator, and then manually rotate the gears which in turn rotates the drive shaft. Turning the gear assembly directly however is extremely time consuming and is far more labor intensive then turning the drive shaft via a traditional handle.

What is needed therefore is an automated means for expanding and retracting the landing gear of a semi-trailer which is efficient and safe to use, yet provides a reliable and easy to use backup means for expanding and retracting the landing gear should the automated means fail.

BRIEF SUMMARY

The current invention provides an apparatus for driving a drive shaft within the landing gear of a semi-trailer. The apparatus includes a handle shaft that is removably coupled to the drive shaft of the landing gear, a collar that is removably coupled to the handle shaft, and a shift lever configured to selectively couple and decouple the collar to and from the handle shaft. The apparatus further includes a motorized gear assembly that is coupled to the collar and an adjustable handle coupled to the handle shaft.

In one particular embodiment, the apparatus also includes a hexagonal tip disposed on the handle shaft and a motorized hand tool which is configured to engage with the hexagonal tip of the handle shaft. This embodiment further includes a hexagonal aperture disposed on the hand tool which is configured to engage with the hexagonal tip of the handle shaft. The hand tool is capable of rotating the hexagonal aperture and further includes a rechargeable battery.

In another embodiment, the apparatus includes a bracket that is removably coupled to a portion of the landing gear and a telescoping brace comprising a distal and a proximal end, wherein the proximal end is connected to a lower portion of the gearbox and wherein the distal end is removably connected to the bracket.

In yet another embodiment, the apparatus has a battery housing that is coupled to a motor housing, wherein the battery housing is configured to accommodate a removable and rechargeable battery and wherein the motor housing is configured to accommodate a motor.

In yet another embodiment, the apparatus also includes a gearbox which is configured to accommodate the motorized gear assembly and collar as well as a user interface disposed on a frontal surface of the gearbox. The user interface has a plurality of input means for operating the motorized gear assembly.

The invention further provides a method for actuating a landing gear of a semi-trailer. The method includes coupling a removable handle shaft disposed within a housing to a drive shaft of the landing gear, selectively actuating a shift lever disposed in the housing between a neutral position and an actuated position, and coupling a removable bracket that is already coupled to the housing to a portion of the landing gear. The method further includes rotating the handle shaft coupled to the drive shaft which then moves the landing gear of the semi-trailer accordingly. Here, selectively actuating a shift lever disposed in the housing between a neutral position and an actuated position involves engaging a collar disposed within the housing to the handle shaft when the shift lever is in the neutral position and disengaging the collar from the handle shaft when the shift lever is in the actuated position.

In one embodiment, rotating the handle shaft coupled to the drive shaft includes actuating the shift lever into the neutral position, activating a motorized gear assembly coupled to the collar, and rotating the collar engaged with the handle shaft in a first direction which then translates the rotational movement of the handle shaft in the first direction to the drive shaft. In this embodiment, activating the motorized gear assembly coupled to the collar is done through interacting with an interface disposed on a frontal surface of the housing.

In a separate embodiment, rotating the handle shaft coupled to the drive shaft includes actuating the shift lever into the actuated position, engaging a handle coupled to the handle shaft to an end of the handle shaft, and rotating the handle in a first direction which then translates the rotational movement of the handle shaft in the first direction to the drive shaft. In this embodiment, engaging the handle coupled to the handle shaft to an end of the handle shaft involves rotating the handle about a joint coupled to a distal end of the handle shaft from a perpendicular position relative to the handle shaft to a parallel positon relative to the handles shaft and then pushing the handle towards the handle shaft to engage the handle to the handle shaft.

In yet another embodiment, rotating the handle shaft coupled to the drive shaft involves actuating the shift lever into the actuated position, engaging a motorized hand tool to an end of the handle shaft, and then rotating the handle in a first direction which then translates the rotational movement of the handle shaft in the first direction to the drive shaft. In this embodiment, engaging the motorized hand tool to the end of the handle shaft is done by inserting a hexagonal aperture disposed on the motorized hand tool into a hexagonal tip of the handle shaft.

In another embodiment, the method step removably coupling a bracket coupled to the housing to a portion of the landing gear includes coupling a proximal end of a removable brace to a bottom portion of the housing, adjusting the length of the brace, and then coupling a distal end of the removable brace to the bracket.

In yet another embodiment, the method also includes connecting a rechargeable battery to the housing.

The current invention further provides for a system for actuating a landing gear of a semi-trailer. The system includes a housing, an adjustable handle coupled to the housing, a motorized hand tool, a rechargeable battery removably disposed within the housing, and at least one means for removably coupling the housing to the landing gear.

In one embodiment, the system also includes a removable bracket and an adjustable brace that is removably coupled between the bracket and the housing.

In yet another embodiment, the housing of the system is configured to be removably coupled to a drive shaft of the landing gear.

In a further embodiment, the motorized hand tool of the system includes a rechargeable battery.

In another embodiment, the housing of the system of claim 16 wherein the housing comprises a handle shaft configured to engage with the motorized hand tool and the adjustable handle.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The disclosure can be better visualized by turning now to the following drawings wherein like elements are referenced by like numerals.

The disclosure and its various embodiments can now be better understood by turning to the following detailed description of the preferred embodiments which are presented as illustrated examples of the embodiments defined in the claims. It is expressly understood that the embodiments as defined by the claims may be broader than the illustrated embodiments described below.

DETAILED DESCRIPTION OF THE PREFERRED EMBODIMENTS

Figure 1:
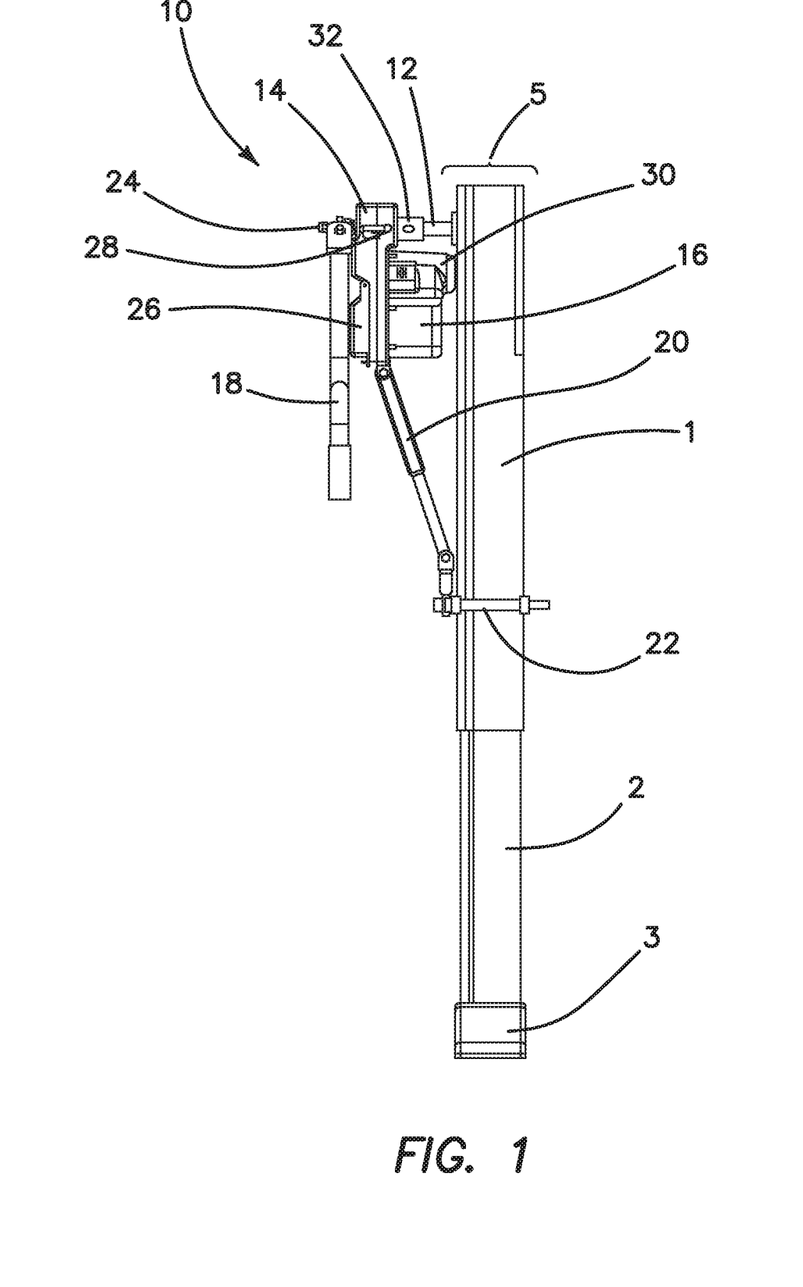
FIG. 1 is a side plan view of the current dual drive mechanism coupled to a leg of a landing gear that forms a part of a semi-trailer.

Detail of the current invention may be seen in FIG. 1 which shows a dual drive mechanism denoted generally by reference numeral 10 coupled to a leg 5 of the landing gear disposed underneath a semi-trailer. As seen in FIG. 1, the leg 5 comprises an upper portion 1 and a lower portion 2 which telescopes in and out of the upper portion 1. Disposed at the distal end of the lower portion 2 is a foot 3 which makes contact with the ground when the lower portion 2 has been fully extended. Also coupled to the leg 5 is a drive shaft 12 which, when rotated, will either raise or lower the telescoping lower portion 2 according to the direction in which the drive shaft 12 is rotated as is known in the art. The drive shaft 12 may only be coupled to a single leg 5 as depicted in FIG. 1, or alternatively, may be coupled to multiple legs 5 of the landing gear. Additionally, while FIG. 1 shows the landing gear of the semi-trailer comprising only one telescopic leg 5, it is to be expressly understood that additional or different configurations of landing gear now known or later devised which may be actuated by the rotation of a drive shaft may be used with the current device without departing from the original spirit and scope of the invention.

Figure 2:
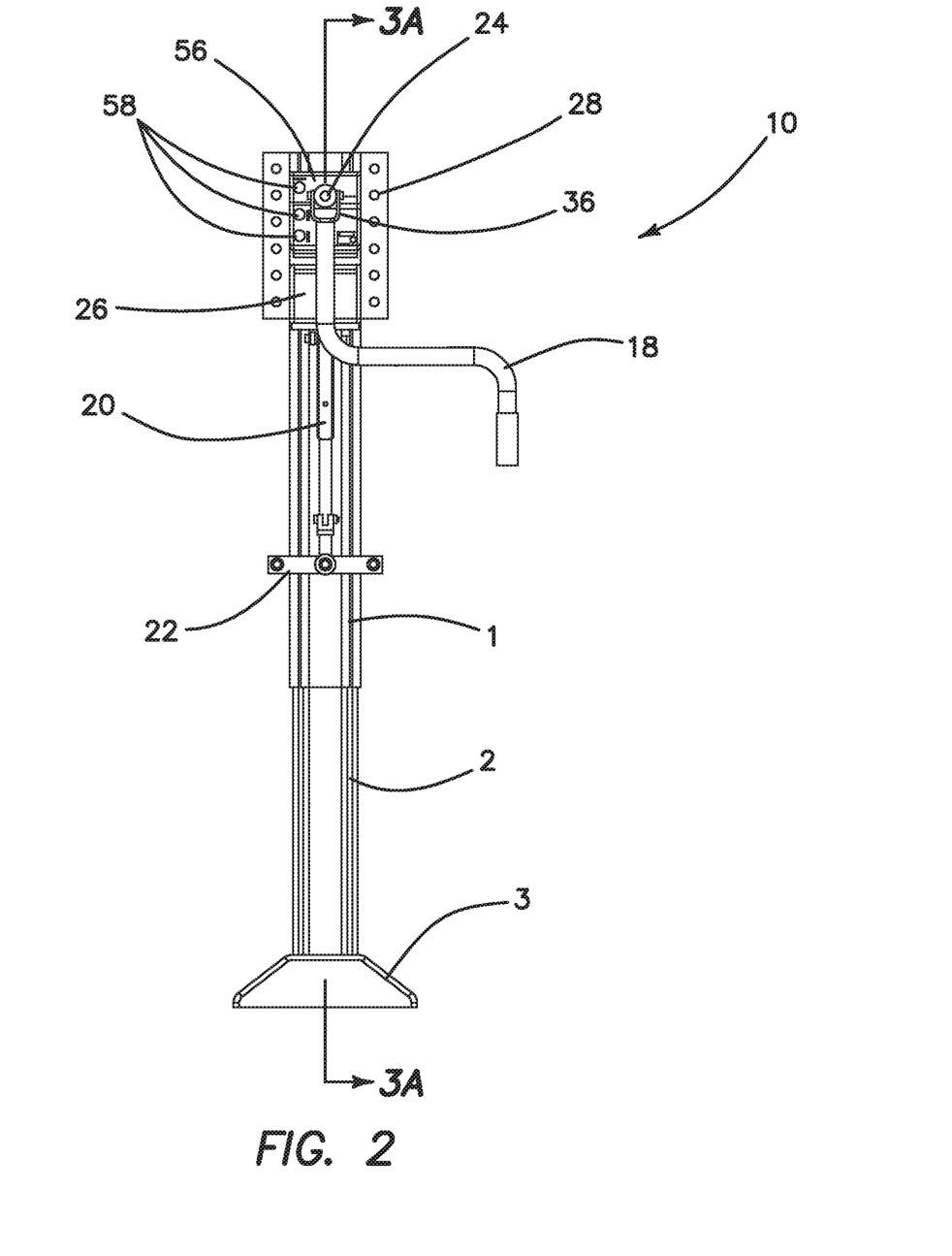
FIG. 2 is frontal view of the dual drive mechanism seen in FIG. 1.
Figure 4:
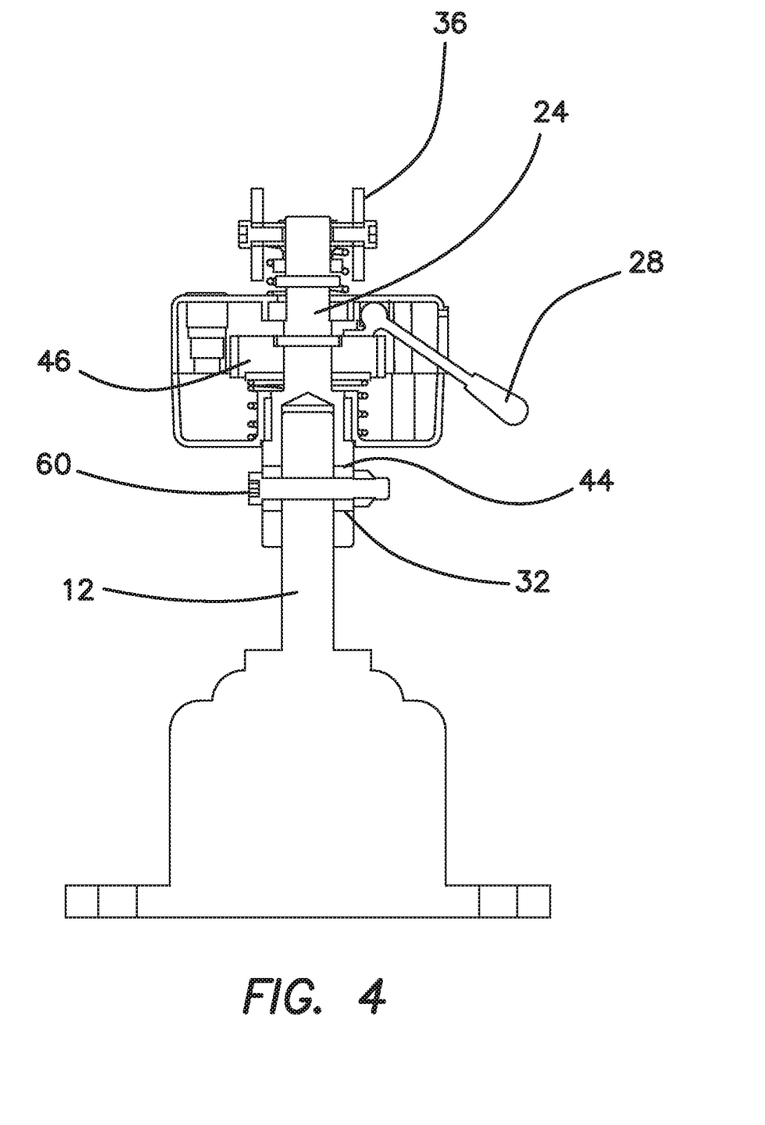
FIG. 4 is a top down cross sectional view of the dual drive mechanism seen in FIG. 1.

The dual drive mechanism 10 seen in FIGS. 1 and 2 principally comprises a gearbox 14, a motor housing 30, a battery housing 16, and a handle 18. The drive shaft 12 of the landing gear is inserted into the gearbox 14 through a draft shaft aperture 32 and into distal portion 44 of the handle shaft 24 as seen in FIG. 4. The drive shaft 12 is locked into place within the draft shaft aperture 32 and handle shaft 24 via a removable pin 60 which is threaded through both drive shaft 12 and the drive shaft aperture 32. Disposed on the opposing side of the gearbox 14 and coaxial relative to the draft shaft 12 is a hexagonal handle shaft 24 which extends perpendicularly relative to the outward facing surface of the gearbox 14. Coupled to the distal end of the handle shaft 24 in turn is a handle 18 via a rotatable U-shaped joint 36. The gearbox 14 further comprises a shift lever 28 which extends outwardly from the gearbox 14 as seen in FIG. 2. Integrally formed with the gearbox 14 is the motor housing 30 and the battery housing 16 which house or accommodate the motor components and the battery, respectively, which are described in further detail below. In addition to the drive shaft 12 being inserted into the gearbox 14, the dual drive mechanism 10 is further coupled to the leg 5 by a brace 20 which is coupled to a bottom portion of the battery housing 16 at one end and to a bracket 22 at its opposing end. The bracket 22 is coupled to the upper portion 1 of the leg 5 via a standard set of bolts or other fasteners as is known in the art. The brace 20 provides additional structural support to the dual drive mechanism 10 as well as prevents extraneous movement of the dual drive mechanism 10 while it is applying torsion forces to the drive shaft 12. The brace 20 additionally comprises a telescoping length which allows the brace 20 to be coupled to the bracket 22 at a variety of positions or heights along the upper portion 1 of the leg 5.

Figure 3A:
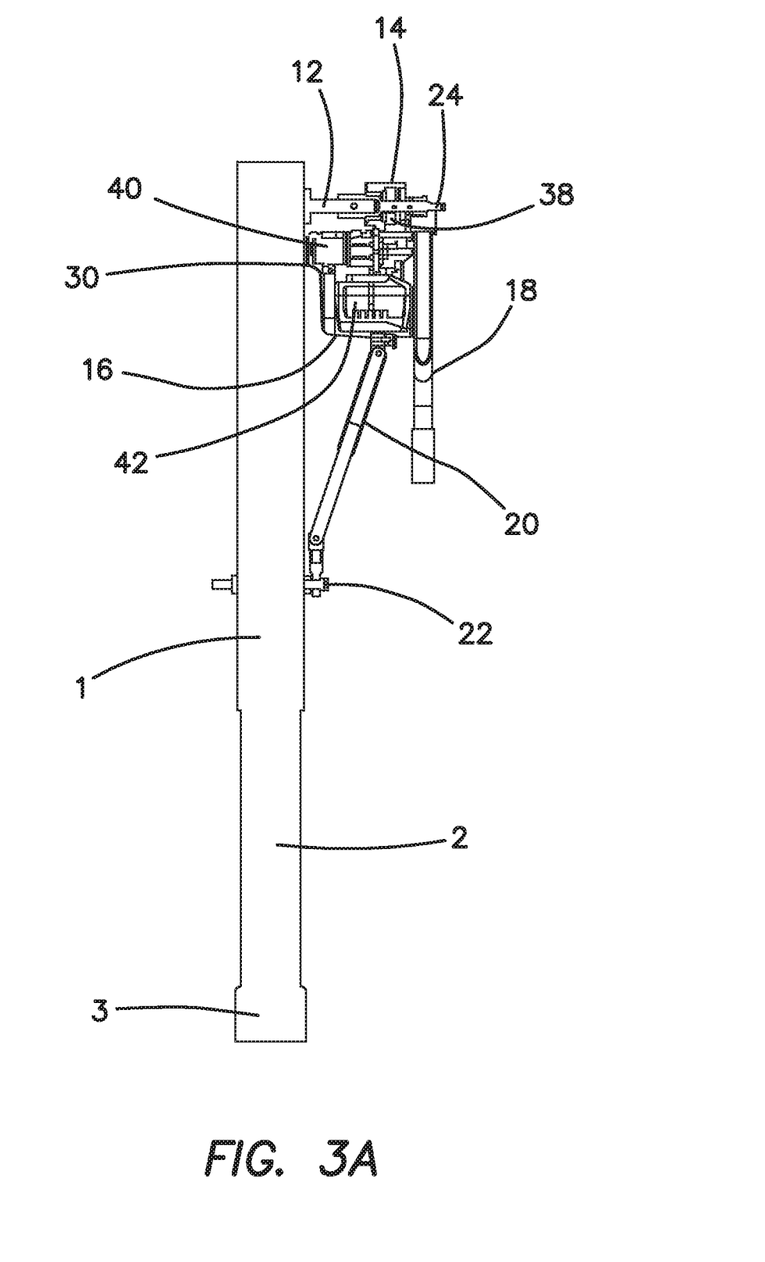
FIG. 3A is a side cross sectional view of the dual drive mechanism seen in FIG. 1.
Figure 3B:
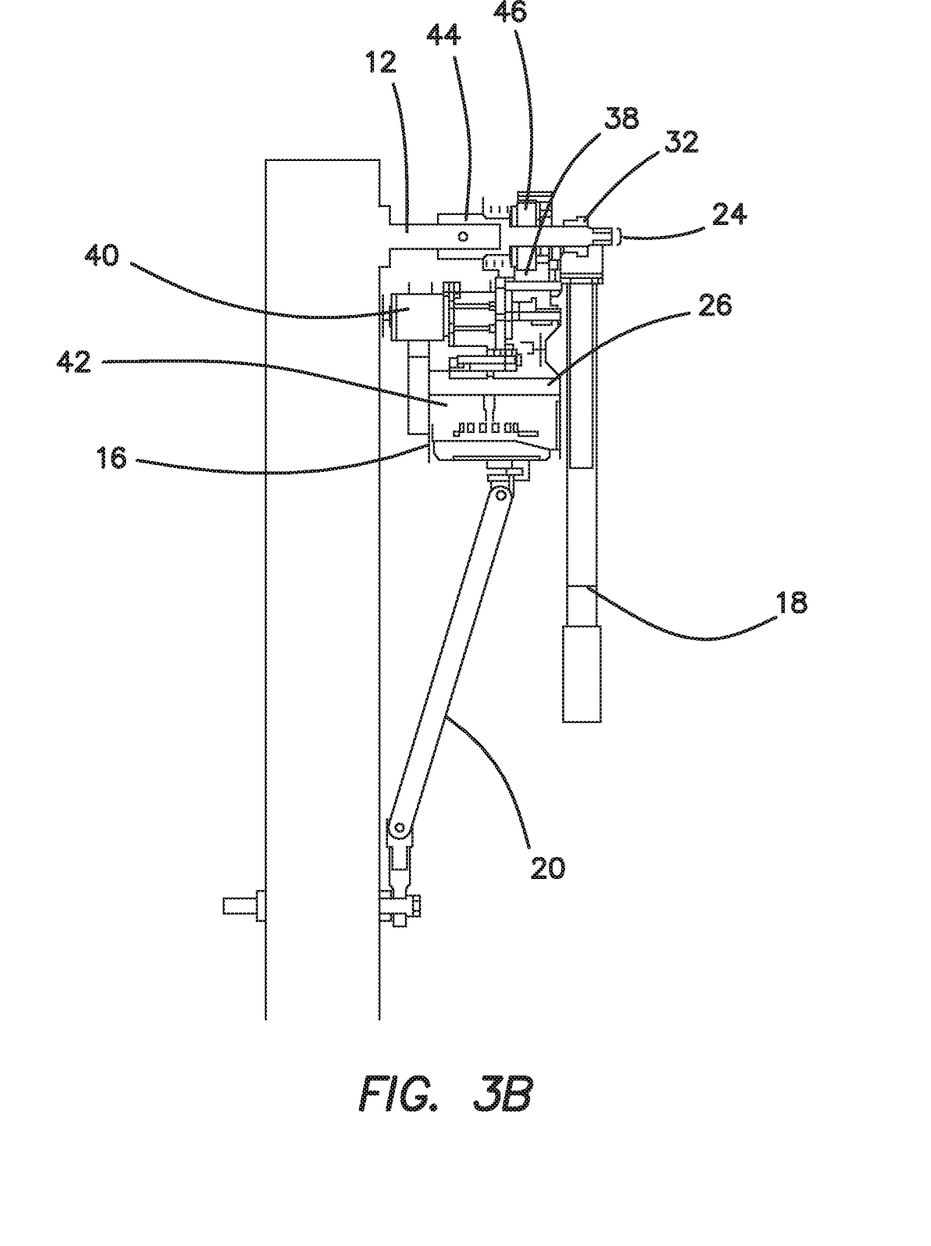
FIG. 3B is a magnified cross sectional view of the dual drive mechanism seen in FIG. 3A.

The internal components of the dual drive mechanism 10 may be had by turning to FIGS. 3A and 3B which shows a side cross sectional view of the device. The battery housing 16 accommodates or houses a removable battery 42 which is inserted into the battery housing 16 through a removable access door 26. The battery 42 is also rechargeable, thus allowing a user to remove the battery 42 from the battery housing 16, recharge it, and then reinsert it into the battery housing 16. The motor 40 within the motor housing 30 is preferably an electric motor that receives power from the removable battery 42 and in turn actuates a gear assembly 38 disposed in the gearbox 14 when activated. The gear assembly 38 through a series of interlocking or meshed gears in turn actuates or rotates a collar 46 that is disposed circumferentially or partially circumferential about a distal portion 44 of the handle shaft 24. When the collar 46 is coupled to or making contact with the handle shaft 24, the rotational movement of the collar 46 translates to the handle shaft 24 which in turn rotates the drive shaft 12 in which it is coupled to, thus raising or lowering the landing gear of the semi-trailer accordingly. Specifically, as seen in the exploded view of FIG. 6, the motor 40 is positioned with its axis parallel to the drive shaft 12. The gear assembly 38 is preferably a worm reduction gear assembly, however other known configurations such as planetary gears, spur gear reduction, or chain drives may be used so as to provide the collar 46 with sufficient torsional or rotational force for rotating the handle shaft 24.

Greater detail of the shift lever 28 and the ability of the dual drive mechanism 10 to switch between means for driving the drive shaft 12 may be had by turning to FIG. 4. The shift lever 28 is disposed within the gearbox 14 and adjacent to the collar 46. When the shift lever 28 is in a neutral position seen in FIG. 4, the collar 46 is allowed to make contact with the handle shaft 24 and rotate it which in turn rotates the drive shaft 12. However, by manipulating the shift lever 28 and moving it into an actuated position, the distal portion of the shift lever 28 lifts or moves the collar 46 off of or away from the handle shaft 24, thereby stopping any translation of movement between the collar 46 and the handle shaft 24. With the collar 46 removed from the handle shaft 24 it can be appreciated that even if the motor 40 and gear assembly 38 continues to rotate the collar 46, the handle shaft 24 will not rotate and any further movement of the drive shaft 12 by the motorized gear assembly 38 and collar 46 will be prevented. Rotation of the handle shaft 24 and the drive shaft 12 may be resumed however if the shift lever 28 is shifted back into the neutral position, thus bringing the collar 46 back into contact with the drive shaft 12. It can be seen therefore that the process of driving the drive shaft 12 by the motorized movement of the collar 46 may then be optionally turned on and off via the manipulation or actuation of the shift lever 28.

In addition to driving the drive shaft 12 via the motor 40, gear assembly 38, and collar 46 as described above, the drive shaft 12 may also be driven by a standard handle 18 or turn crank. To do so, a user first makes sure that the shift lever 28 is in the actuated position, thereby ensuring that the collar 46 is moved up or off of the handle shaft 24. The handle 18 is then rotated upward until the U-shaped joint 36 is coaxial or parallel with the handle shaft 24. The handle 18 and its corresponding U-shaped joint 36 are then pushed inward towards the drive shaft 12, thereby engaging the U-shaped joint 36 with a distal end of the handle shaft 24. The user may then rotate the handle 18 by hand. Rotation of the handle 18 rotates the handle shaft 24 which in turn rotates the drive shaft 12 thus raising or lowering the landing gear of the semi-trailer. Because the collar 46 is disengaged from the handle shaft 24 by the shift lever 28, both the handle shaft 24 and the drive shaft 12 are free to rotate without any interference or resistance from the gear assembly 38 or the motor 40. Because the gear assembly 38 and motor 40 are not in use while the handle 18 is being rotated, any damage to the gear assembly 38 by the forced rotation of the handle shaft 24 is prevented and any need for the user rotating the drive shaft 12 to also rotate the gears within the gear assembly 38 is eliminated. To decouple the handle 18, the user pulls the handle 18 and the U-shaped joint 36 away from the drive shaft 12 and then lets the handle 18 rotate back down towards its resting position seen in FIGS. 1-3B.

Figure 5:
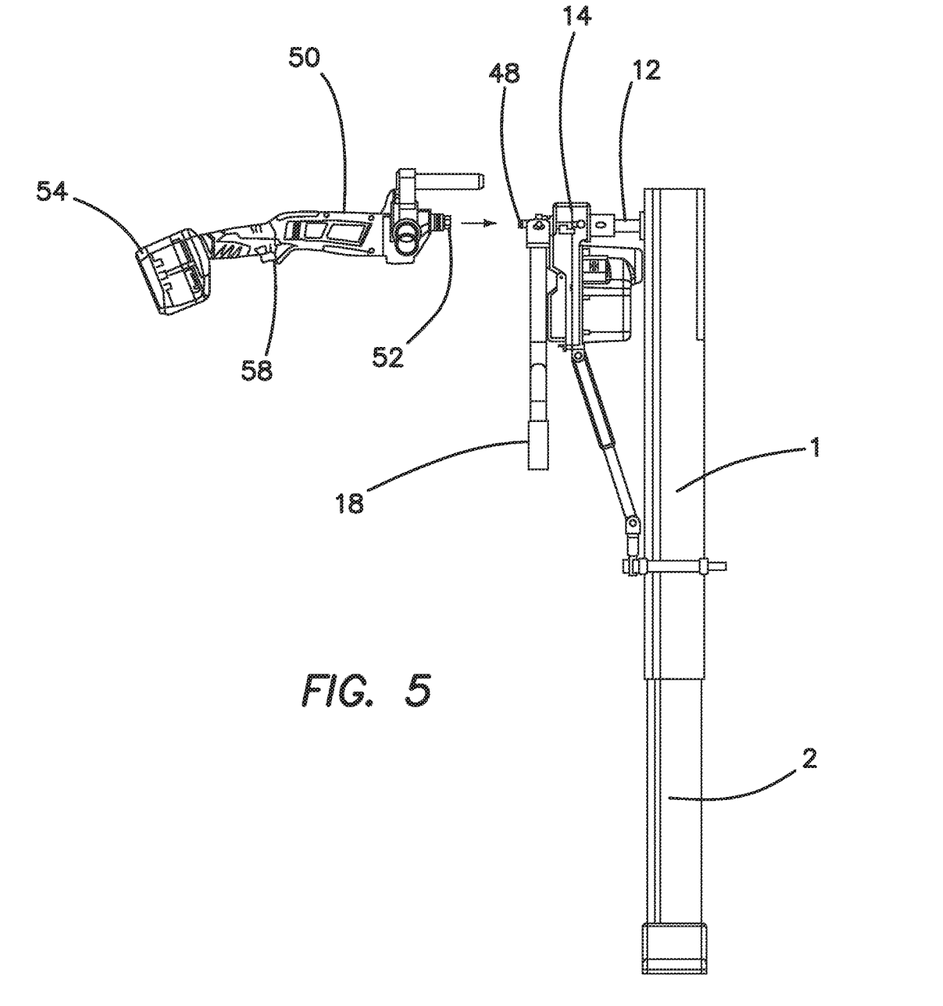
FIG. 5 is a side view of an alternative embodiment of the dual drive mechanism comprising a hand tool which may be coupled to the handle shaft of the dual drive mechanism.
Figure 6:
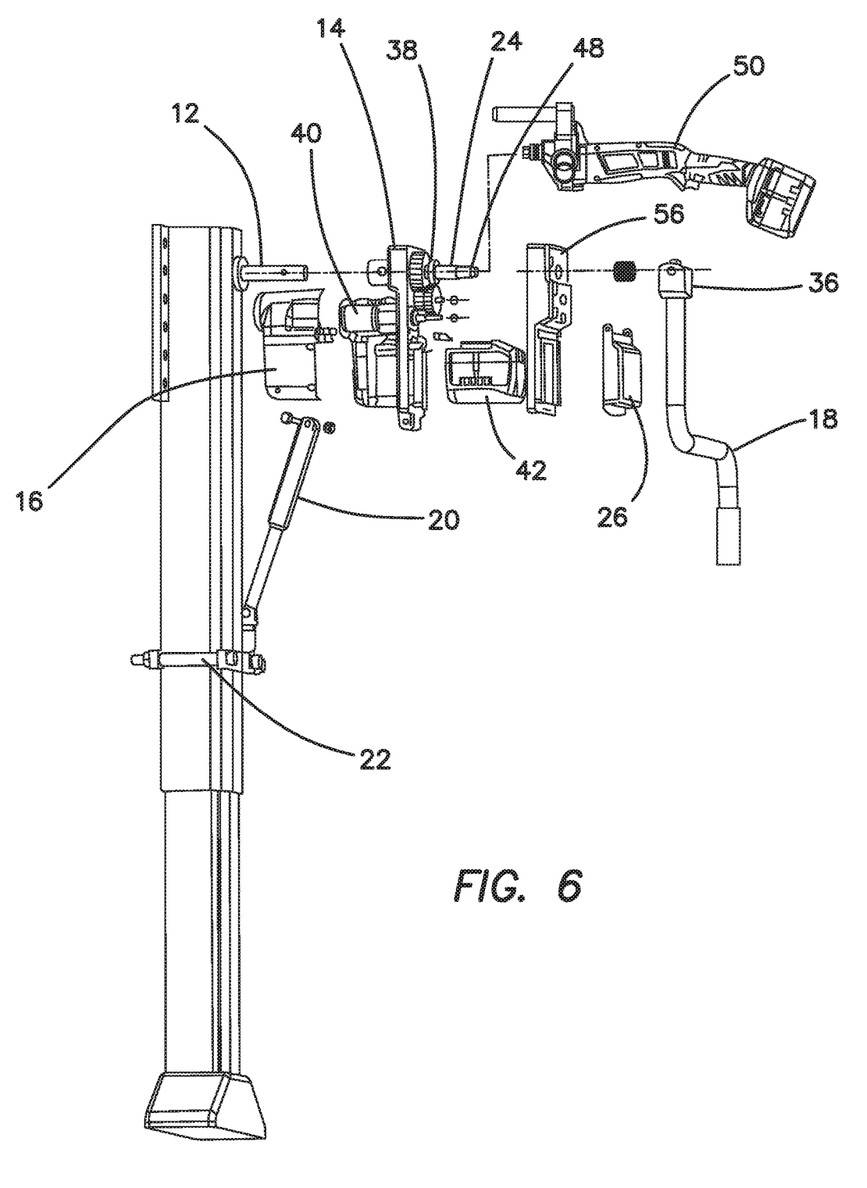
FIG. 6 is an exploded view of the dual drive mechanism seen in FIG. 5.

A third means for rotating the drive shaft 12 of the landing gear may be had by turning to FIGS. 5 and 6. In this embodiment, the handle shaft 24 comprises a substantially hexagonal surface or distal tip 48. With the shift lever 28 in the actuated position, an electric hand tool 50 comprising a substantially hexagonal aperture 52 may be pressed against the handle shaft 24 until the hexagonal tip 48 enters the hexagonal aperture 52. The hand tool 50 may then be activated through the compression of a trigger 58 or other equivalent activation means which then begins to rotate the handle shaft 24 through the coupling formed by the hexagonal aperture 52 and tip 48. The rotational movement of the handle shaft 24 is then translated to the drive shaft 12. The hand tool 50 may rotate or spin the motorized aperture 52 in either the clockwise or counterclockwise orientation as is known in the art. Similar to the previous embodiment discussed above, the rotation of the handle shaft 24 by the hand tool 50 in turn rotates the drive shaft 12 which raises or lowers the landing gear of the semi-trailer accordingly. Because the collar 46 is disengaged from the handle shaft 24 by the shift lever 28, both the handle shaft 24 and the drive shaft 12 are free to rotate without any interference or resistance from the gear assembly 38 or the motor 40. To disengage the hand tool 50, the user pulls the hand tool 50 away from the drive shaft 12 and removes the hexagonal tip 48 from the aperture 52. The user may recouple the hand tool 50 if necessary or alternatively, continue to rotate the drive shaft 12 by means of the handle 18 or the motorized gear assembly 38 as discussed above. The hand tool 50 is preferably powered by a rechargeable battery 54 that is separate from the battery 42 used to power the motor 40.

To use the dual drive mechanism 10, the user approaches a user interface or face plate 56 that forms a frontal surface of the gearbox 14. As seen in FIG. 2, the user interface 56 comprises a plurality of push buttons, switches, display screens, or other means 58 for inputting commands into the dual drive mechanism 10. The user first ensures that the shift lever 28 is in the neutral position and therefore the collar 46 is in contact or otherwise engaged with the handle shaft 24. The user may then activate the dual drive mechanism 10 by manipulation of the plurality of input means 58. Specifically, the user may first turn on the dual drive mechanism 10 and then instruct the dual drive mechanism 10 to expand or retract the landing gear of the semi-trailer by actuation of the appropriate input means 58. For example, if the user wishes to expand or lower the lower portion 2 of the legs 5, the user pushes a "down" button which is part of the input means 58 disposed on the user interface 56. The motor 40 then begins to turn the gear assembly 38 and collar 46 which in turn begins to rotate the handle shaft 24 in the direction corresponding to the user's input command. As discussed above, the handle shaft 24 translates its rotational movement to the drive shaft 12 which in turn lowers the lower portion 2 and foot 3. The motorized gear assembly 38 and collar 46 continually rotates the drive shaft 12 for as long as the user depresses or actuates the input means 58, until the foot 3 makes contact with the ground or other object, or alternatively, for a predetermined amount of time as dictated by an internal memory or microcontroller disposed within the user interface 56 as is known in the art. With the lower portion 2 of the leg 5 fully extended, the user is may lower a different leg 5 if needed using the same dual drive mechanism 10, or alternatively, using a different dual drive mechanism 10 corresponding to each of the legs 5 within the landing gear of the semi-trailer. Once all of the legs 5 of the landing gear of the semi-trailer are lowered, the user may then couple or decouple the tractor unit from the semi-trailer.

To raise or contract the lower portion 2 of the leg 5 and raise the foot 3 from the ground, the user pushes an "up" button which is part of the input means 58 disposed on the user interface 56. The motor 40 then begins to turn the gear assembly 38 and collar 46 which in turn rotated the handle shaft 24 in the direction corresponding to the user's latest input command. It can be appreciated that the motorized gear assembly 38 and collar 46 will turn the handle shaft 24 and drive shaft 12 in two separate directions, namely a direction which corresponds to the user actuating the "down" input means 58 and a different direction which corresponds to the user actuating the "up" input means 58. The rotation of the drive shaft 12 lifts or retracts the lower portion 2 into the upper portion 1 of the leg 5 as is known in the art. The motorized gear assembly 38 and collar 46 continually rotates the drive shaft 12 in the selected direction for as long as the user depresses or actuates the input means 58, until the lower portion 2 is fully nested within the upper portion 1, or alternatively, for a predetermined amount of time as dictated by an internal memory or microcontroller disposed within the user interface 56 as is known in the art.

To enhance the stability of the dual drive mechanism 10, the user may also couple the bracket 22 using a bolt or other traditional fixture means at a desired height of the upper portion 1 of the leg 5. The brace 20 coupled to the bottom of the dual drive mechanism 10 is then coupled to the bracket 22 by inserting a distal portion of the brace 20 into the bracket 22. The brace 20 may then be locked into position within the bracket 22 by the adjustment of a wing nut, thumb screw, or other equivalent means. Because the brace 20 comprises a telescoping length, the brace 20 may be extended or retracted to nearly any position along the upper portion 1 of the leg 5 where the bracket 22 may be located. Additionally, should the bracket 22 need to be moved to another location along the upper portion 1, the brace 20 may be decoupled and have its length adjusted according to the new position of the bracket 22.

To recharge the dual drive mechanism 10, the user accesses the battery housing 16 by opening the access door 26. The battery 42 may then be slid outwards out of the battery housing 16 and then installed or coupled to a battery charger or charging station currently known in the art. After being sufficiently charged, the battery 42 may be slid back into the battery housing 16 until sufficient contacts between the battery 42 and the internal electronics of the dual drive mechanism 10 have been established.

Should the motor 40, gear assembly 38, and/or battery 42 break or otherwise fail, the user has the option of switching to an alternative means for driving the drive shaft 12 and then continue to raise or lower the landing gear of the semi-trailer as needed. Upon the detection of the failed motor 40, gear assembly 38, battery 42, or other component of the dual drive mechanism 10, the user changes the means in which the drive shaft 12 is driven by moving the shift lever 28 into the actuated position which moves the collar 46 off of the handle shaft 24 as discussed above. In one embodiment, the handle 18 may be engaged by bringing it upwards and coupling it to the handle shaft 24. The handle 18 is then rotated in the same direction so as to continue the original movement of the landing gear. Alternatively, after moving the shift lever 28 into the actuated position, the user may instead couple the hand tool 50 to the handle shaft 24 via the aperture 52 and continue to drive the drive shaft 12 by actuation of the hand tool 50. Regardless if either the handle 18 or the hand tool 50 is used however, rotation of the drive shaft 12 is accomplished without the need of also actuating the gear assembly 38 and collar 46 by hand, thus making the process of raising or lowering the landing gear of the semi-trailer more efficient and easier to perform. Because the shift lever 28 selectively engages the motorized gear assembly 38 to the handle shaft 24 at the direction of the user, the user may choose to use the handle 18 and/or the hand tool 50 at any time when lowering or raising the lower portion 2 of the leg 5. It is in this fashion therefore that the landing gear of the semi-trailer may be raised or lowered should the motorized gear assembly 38 or other component of the dual drive mechanism 10 fail, or for when environmental conditions do not permit electronic operation of the dual drive mechanism 10.

Figure 7:
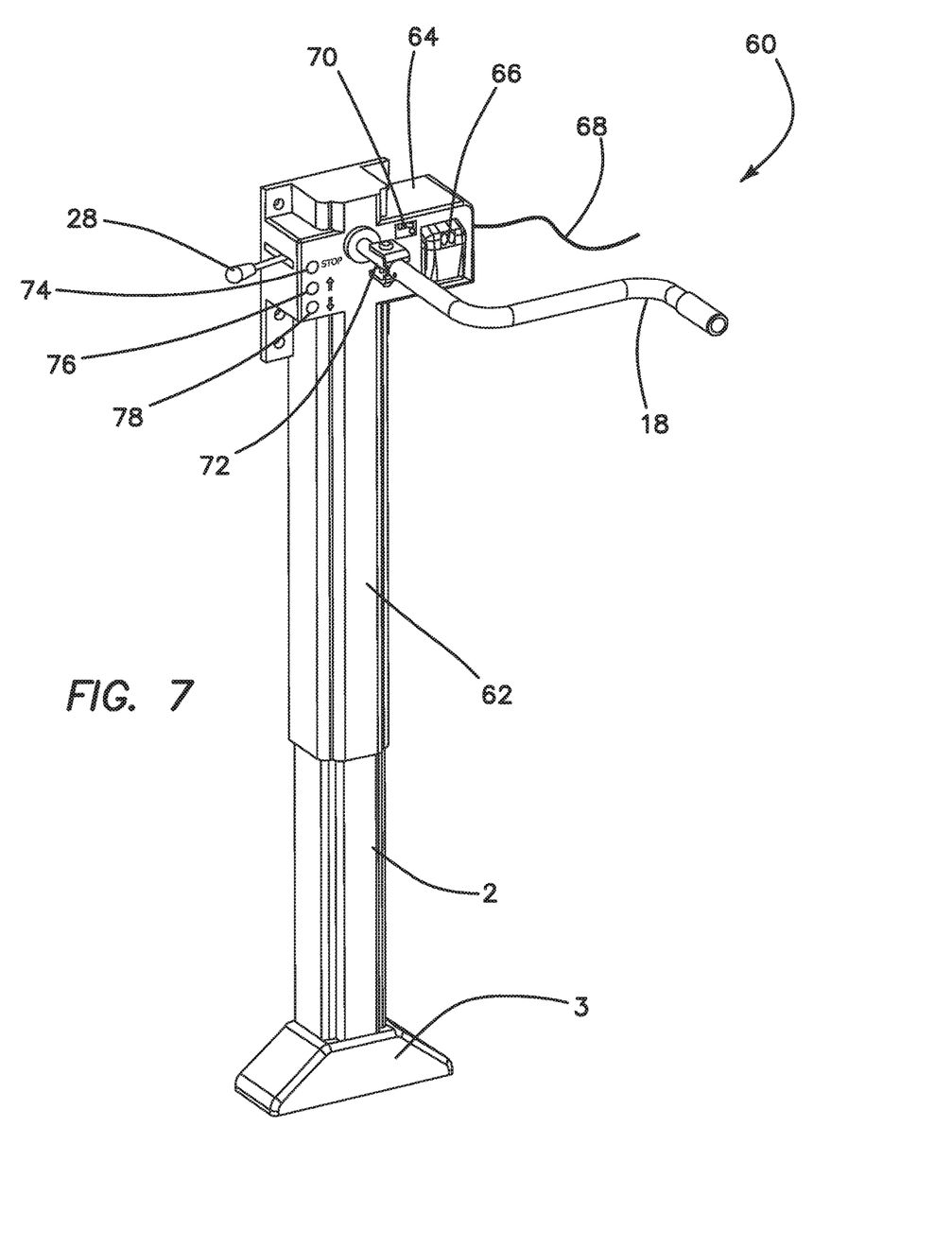
FIG. 7 is a perspective view of an alternative embodiment of the current invention wherein the dual drive mechanism is incorporated within the structure of the upper portion of the landing gear.

An alternative embodiment of the dual drive mechanism 60 may be seen in FIG. 7 where a motor housing 64 of the dual drive mechanism 60 is incorporated into the structure of the upper portion 62 of the landing gear itself. Here, the drive shaft of the landing gear is disposed within the upper portion 62 and coupled to a handle shaft 72 which protrudes from the face of the motor housing 64. A shift lever 28 is disposed on one lateral side of the motor housing 64 which, like in the previous embodiment described above, cooperates with the internal components of the motor housing 64 similar to what is seen in FIGS. 3B, 4A, and 6 to alternate the drive function of the device. The front face of the motor housing 64 further comprises a battery indicator light 70, an "up" button 76, a "down" button 78, and a "stop" or "off" button 74. A display screen 66 is also optionally disposed within the front face of the motor housing 64. Additionally, a wire 68 is coupled to the dual drive mechanism 60 at one end and to the electronics of the tractor unit at the opposing end. When the wire 68 is properly connected and when the tractor unit is activated or in use as is known in the art, the wire 68 charges a rechargeable and removable battery disposed within the motor housing 64 of the dual drive mechanism 60.

To raise or contract the lower portion 2 of the leg 5 and raise the foot 3 from the ground using the embodiment seen in FIG. 7, the user pushes an "up" button 76 which then activates a motor within the motor housing 64 and begins to turn a gear assembly and collar which in turn rotates the handle shaft 72 in the direction corresponding to the user's latest input command. It can be appreciated that the motorized gear assembly and collar will turn the handle shaft 72 and drive shaft in two separate directions, namely a direction which corresponds to the user actuating the "down" button 78 and a different direction which corresponds to the user actuating the "up" button 76. The rotation of the drive shaft lifts or retracts the lower portion 2 into the upper portion 1 of the leg 5 as is known in the art. The motorized gear assembly and collar continually rotates the drive shaft in the selected direction for as long as the user depresses or actuates the "up" button 76, until the lower portion 2 is fully nested within the upper portion 62, or alternatively, for a predetermined amount of time as dictated by an internal memory or microcontroller disposed within the motor housing 64 as is known in the art.

Should the motor, gear assembly, and/or battery break or otherwise fail, the user has the option of switching to an alternative means for driving the drive shaft and then continue to raise or lower the landing gear of the semi-trailer as needed. Upon the detection of the failed motor, gear assembly, battery, or other component of the dual drive mechanism 60, the user changes the means in which the drive shaft is driven by moving the shift lever 28 into the actuated position which moves the collar off of the handle shaft 72 as discussed above. In one embodiment, the handle 18 may be engaged by bringing it upwards and coupling it to the handle shaft 72. The handle 18 is then rotated in the same direction so as to continue the original movement of the landing gear. It can be seen therefore that because the shift lever 28 moves the collar off of the handle shaft 72, the rotation of the drive shaft is accomplished without the need of also actuating the gear assembly and collar by hand, thus making the process of raising or lowering the landing gear of the semi-trailer more efficient and easier to perform. Because the shift lever 28 selectively engages the motorized gear assembly to the handle shaft 72 at the direction of the user, the user may choose to use the handle 18 and/or another suitable hand tool at any time when lowering or raising the lower portion 2 of the leg 5. It is in this fashion therefore that the landing gear of the semi-trailer may be raised or lowered should the motorized gear assembly or other component of the dual drive mechanism 60 fail, or for when environmental conditions do not permit electronic operation of the dual drive mechanism 60.

It can further be seen that since the dual drive mechanism 60 as seen in FIG. 7 is incorporated into the structure of the upper portion 62 of the landing gear, a sufficiently strong and stable coupling between the moving components of the dual drive mechanism 60 and the remaining portions of the landing gear is achieved and no additional braces or support structures are required.

Many alterations and modifications may be made by those having ordinary skill in the art without departing from the spirit and scope of the embodiments. Therefore, it must be understood that the illustrated embodiment has been set forth only for the purposes of example and that it should not be taken as limiting the embodiments as defined by the following embodiments and its various embodiments.

Therefore, it must be understood that the illustrated embodiment has been set forth only for the purposes of example and that it should not be taken as limiting the embodiments as defined by the following claims. For example, notwithstanding the fact that the elements of a claim are set forth below in a certain combination, it must be expressly understood that the embodiments includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the embodiments is explicitly contemplated as within the scope of the embodiments.

The words used in this specification to describe the various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the embodiments.

We claim:

1. An apparatus for driving a drive shaft within the landing gear of a semi-trailer comprising:
   a handle shaft removably coupled to the drive shaft of the landing gear;
   a collar removably coupled to the handle shaft;
   a shift lever configured to selectively couple and decouple the collar to and from the handle shaft;
   a motorized gear assembly coupled to the collar;
   an adjustable handle coupled to the handle shaft;
   a bracket removably coupled to an upper portion of the landing gear; and
   a telescoping brace comprising a distal and a proximal end, wherein the proximal end is coupled to a lower portion of the gearbox and wherein the distal end is removably coupled to the bracket.

2. The apparatus of claim 1 further comprising:
   a hexagonal tip disposed on the handle shaft; and
   a motorized hand tool configured to engage with the hexagonal tip of the handle shaft.

3. The apparatus of claim 1 further comprising a battery housing coupled to a motor housing, wherein the battery housing is configured to accommodate a removable and rechargeable battery and wherein the motor housing is configured to accommodate a motor.

4. The apparatus of claim 1 further comprising:
   a gearbox configured to accommodate the motorized gear assembly and collar; and
   a user interface disposed on a frontal surface of the gearbox, wherein the user interface comprises a plurality of input means for operating the motorized gear assembly.

5. The apparatus of claim 2 wherein the motorized hand tool comprises:
   a hexagonal aperture configured to engage with the hexagonal tip of the handle shaft;
   means for rotating the hexagonal aperture; and
   a rechargeable battery.

6. A method for actuating a landing gear of a semi-trailer comprising:
   removably coupling a handle shaft disposed within a housing to a drive shaft of the landing gear;
   selectively actuating a shift lever disposed in the housing between a neutral position and an actuated position;
   removably coupling a bracket coupled to the housing to a portion of the landing gear;
   rotating the handle shaft coupled to the drive shaft; and
   moving the landing gear of the semi-trailer,
   wherein selectively actuating a shift lever disposed in the housing between a neutral position and an actuated position further comprises engaging a collar disposed within the housing to the handle shaft when the shift lever is in the neutral position and disengaging the collar from the handle shaft when the shift lever is in the actuated position.

7. The method of claim 6 wherein rotating the handle shaft coupled to the drive shaft comprises:
   actuating the shift lever into the neutral position;
   activating a motorized gear assembly coupled to the collar;
   rotating the collar engaged with the handle shaft in a first direction; and
   translating the rotational movement of the handle shaft in the first direction to the drive shaft.

8. The method of claim 6 wherein rotating the handle shaft coupled to the drive shaft comprises:
   actuating the shift lever into the actuated position;
   engaging a handle coupled to the handle shaft to an end of the handle shaft;
   rotating the handle in a first direction; and
   translating the rotational movement of the handle shaft in the first direction to the drive shaft.

9. The method of claim 8 wherein engaging a handle coupled to the handle shaft to an end of the handle shaft comprises:
   rotating the handle about a joint coupled to a distal end of the handle shaft from a perpendicular position relative to the handle shaft to a parallel positon relative to the handles shaft; and
   pushing the handle towards the handle shaft to engage the handle to the handle shaft.

10. The method of claim 6 wherein rotating the handle shaft coupled to the drive shaft comprises:
    actuating the shift lever into the actuated position;
    engaging a motorized hand tool to an end of the handle shaft;
    rotating the handle shaft in a first direction; and
    translating the rotational movement of the handle shaft in the first direction to the drive shaft.

11. The method of claim 10 wherein engaging the motorized hand tool to the end of the handle shaft comprises inserting a hexagonal aperture disposed on the motorized hand tool into a hexagonal tip of the handle shaft.

12. The method of claim 7 wherein activating a motorized gear assembly coupled to the collar comprises interacting with an interface disposed on a frontal surface of the housing.

13. The method of claim 6 wherein removably coupling a bracket coupled to the housing to a portion of the landing gear comprises:
    removably coupling a proximal end of a brace to a bottom portion of the housing;
    adjusting the length of the brace; and
    removably coupling a distal end of the brace to the bracket.

14. The method of claim 6 further comprising connecting a rechargeable battery to the housing.

15. A system for actuating a landing gear of a semi-trailer comprising:
    a housing;
    an adjustable handle coupled to the housing;
    a motorized hand tool;
    a rechargeable battery removably disposed within the housing; and
    means for removably coupling the housing to the landing gear,
    wherein the means for removably coupling the housing to the landing gear comprises:
    a removable bracket; and
    an adjustable brace removably coupled between the bracket and the housing.

16. The system of claim 15 wherein the housing is configured to be removably coupled to a drive shaft of the landing gear.

17. The system of claim 15 wherein the motorized hand tool comprises a rechargeable battery.

18. The system of claim 15 wherein the housing comprises a handle shaft configured to engage with the motorized hand tool and the adjustable handle.

* * * * *